United States Patent
Mazaki et al.

(10) Patent No.: US 6,959,771 B2
(45) Date of Patent: Nov. 1, 2005

(54) ABRASIVE AND BORING METHOD USING THE SAME

(75) Inventors: Shigeru Mazaki, Saitama (JP); Tsuyoshi Kawahara, Yokohama (JP)

(73) Assignees: Mitsubishi Materials Corporation, Tokyo (JP); Nippon Diamond Co., Ltd., Kanagawa (JP)

( * ) Notice: Subject to any disclaimer, the term of this patent is extended or adjusted under 35 U.S.C. 154(b) by 583 days.

(21) Appl. No.: 10/117,062

(22) Filed: Apr. 8, 2002

(65) Prior Publication Data

US 2002/0182018 A1 Dec. 5, 2002

(30) Foreign Application Priority Data

Apr. 11, 2001 (JP) .................................... P2001-112556
Jan. 25, 2002 (JP) .................................... P2002-017327

(51) Int. Cl.⁷ .............................................. B24D 3/02
(52) U.S. Cl. ........................... 175/57; 175/403; 51/308
(58) Field of Search .............................. 175/213, 403, 175/405.1, 57; 408/1 R; 51/308

(56) References Cited

U.S. PATENT DOCUMENTS

| 4,009,027 A | 2/1977 | Naidich et al. |
| 4,184,853 A | 1/1980 | Otopkov et al. |
| 4,664,679 A | 5/1987 | Kohyama et al. |
| 5,352,254 A | 10/1994 | Celikkaya |
| 6,192,875 B1 | 2/2001 | Koroku et al. |
| 6,792,735 B2 * | 9/2004 | Mohlenhoff ............. 52/742.16 |

FOREIGN PATENT DOCUMENTS

| GB | 2255299 A1 | 11/1992 |
| GB | 2261182 A1 | 5/1993 |
| JP | 4319408 | 11/1992 |

OTHER PUBLICATIONS

European Search Report dated May 22, 2003.
Official Communication from the European Patent Office.

* cited by examiner

*Primary Examiner*—William Neuder
(74) *Attorney, Agent, or Firm*—Rader, Fishman & Grauer PLLC

(57) ABSTRACT

The present invention relates to an abrasive that decreases the heat generation by a core bit due to boring and allows the boring of a deep hole while maintaining the boring speed even when a deep hole is cut using a dry method. This abrasive contains abrasive grains, particles of anhydrous silica having a particle diameter from 5 nm to 50 nm and silanol groups in the surface thereof, and hydrous resin which discharges water when the hydrous resin is pressed by a core bit or the temperature of the hydrous resin rises. The abrasive 51 is supplied between the distal end of a rotating core bit 11 and a working material 20.

7 Claims, 3 Drawing Sheets

ABRASIVE AND BORING METHOD USING THE SAME

BACKGROUND OF THE INVENTION

1. Field of the Invention

The present invention relates to an abrasive which can be advantageously used for dressing diamond segments of a core bit when boring a working material such as asphalt or concrete by the core bit, and a boring method using the abrasive.

2. Description of the Related Art

Conventionally, for boring a working material such as asphalt, concrete, or the like, a boring method is known in which a circular groove is cut into the working material wherein a core bit, which has diamond segments comprising diamond abrasive grains or the like attached to the distal end opening of a cylindrical core, is pressed against the working material while being rotated by a drive source such as a motor.

The diamond segments are formed by dispersing diamond abrasive grains or the like in a binder phase made by sintering a binder material such as a metal bond. To maintain an advantageous boring condition, the new diamond abrasive grains in the inner layers must appear in sequence after an appropriate amount of wear of the binder material, promoting what is termed a self-sharpening function or a dressing function, after diamond abrasive grains on the outermost surface have lost the capacity to function as a boring blade because of deterioration and defects.

FIG. 4 shows one example of a core bit having this type of structure, and is an exploded perspective drawing showing the distal end part. In this drawing, reference numeral 110 is a shank and 310 are diamond segments. As shown in FIG. 4, at the distal end part 110a, which is the open end of the cylindrical shank 110 that rotates around an axis, a plurality of diamond segments 310 are affixed at a predetermined distances in the circumferential direction so as to project from the distal end of the shank 110, for example, by soldering or laser welding. Furthermore, in the radial direction of the shank 110, the thickness of the diamond segments 310 is formed so as to be thicker than the thickness of the shank 110, that is, the distance between the inner circumferential surface and the outer circumferential surface of the shank 110. Moreover, the diamond segments 310 are formed by the diamond abrasive grains W or the like being dispersed in a binder phase made by sintering a binder material such as a metal bond.

However, in the case that the working material is hard, because the chips are reduced to fine particles, not only is realizing the dressing function of the diamond segments impossible, but the chips adhere to the binder material, the diamond abrasive grains are surrounded, and a ceramic-like state is formed having a surface that is dense and smooth. The promotion of friction heat is brought about due to what is termed loading. Thereby, as disclosed, for example, in Japanese Unexamined Patent Application, First Publication, No. Hei 4-319408, a boring method is used in which, while boring the working material, abrasive grains, such as alumina, silicon carbide, or molding sand and grinder powder, are supplied to the boring member as an abrasive that dresses the diamond segments. At the same time, the friction of the diamond segments due to the boring heat is reduced by cooling the diamond segments using a dry method in which a gas such as air is supplied to the boring member as a cooling fluid, or using a wet method in which a fluid such as water is supplied to the boring member.

Except for boring comparatively shallow holes, actual boring operations generally use a wet method that employs water or the like. In particular, in cases where a hole having a depth of one meter or greater is necessary, such as when mounting pipes by boring the wall of a nuclear power generating station or boring a thick working material such as the beam of a structure, conventionally the wet method must be relied on. This is because in the case of boring a deep hole by the dry method, even if the cooling fluid such as compressed air can be delivered along with the abrasive to and the distal end of the core bit, it is blocked in the narrow gap between the inner circumferential surface of the core bit and the inner circumferential wall of the cut groove that is being cut, and thus sufficient compressed air and abrasives cannot be supplied up to the distal end of the diamond segments. In particular, in the case of boring a deep hole by the dry method, there is the problem that the abrasives become obstructed before they arrive at the distal end of the core bit, and as a result, the diamond segments are not sufficiently dressed. Between diamond abrasive grains of the diamond segments or the regions that extend towards the upper axial direction from the diamond segments, the part indicated by the slanted line in FIG. 5 (shown in the figure by R), loading occurs due to the chips, the boring speed decreases due to the core bit becoming heated, and in the case of boring a hard working material such as hard reinforced concrete, there is the problem that boring can only be carried out part way. Therefore, when applying the dry method, in the case that the boring speed decreases, it is necessary to suspend the operation and extract and cool the core bit, or carry out the dressing of the diamond segments using a dressing, or replace the core bit, and these operations involve a considerable increase in labor and time.

For these reasons, conventionally boring has generally been carried out by the wet method. However, in most cases, work is carried out while people inhabit the structures that are the object of the work, and thus there are many times that it is desirable to avoid using this wet method that employs water because the sludge into which the chips and the dust are mixed that occurs due to the drying of the sludge causes deterioration of a residential environment. In contrast, in the case of the dry method using air or the like, the dust that is produced can be collected by a dust collecting apparatus.

Thus, in order to prevent contamination of the surrounding environment, there is a strong demand to carry out the boring of deep holes using the dry method, while at the same time there is the problem that when using the dry method, presently the labor and time for the boring operation increases drastically.

In consideration of the problems described above, it is an object of the present invention to provide an abrasive that can reduce the heat generation of the core bit due to boring and allow the boring of a deep hole while maintaining the boring speed when boring a deep hole using the dry method, and a boring method that uses the same.

SUMMARY OF THE INVENTION

The first aspect according to the present invention is an abrasive which can be supplied between diamond segments of a core bit and a working material to be bored by the core bit in order to dress the diamond segments. The diamond segments have diamond grains supported by a binder. The abrasive comprises abrasive grains and particles of anhydrous silica having a particle diameter from 5 nm to 50 nm and silanol groups in the surface thereof.

The abrasive grains may be at least one of alumina, silicon carbide, molding sand, and grinder powder, for carrying out dressing of the diamond segments.

Because the fluidity of the abrasive according to the first aspect is high, even in the case of boring a deep hole, it becomes possible to supply sufficient abrasive grains to the diamond segments on the distal end of the core bit, the dressing of the diamond segments can be carried out efficiently, and the heat generated due to the boring by the core bit can be decreased by preventing loading of the diamond segments by the chips. In addition, due to the particles of anhydrous silica, the fluidity of the chips is similarly increased, and thus the chips do not get clogged at the distal end of the core bit and can be efficiently discharged, and the heat generation by the core bit can be reduced by decreasing the frictional heat between the chips and the working material. In this manner, the boring of a deep hole can be carried out using a dry method that reduces the heat generation by the core bit while maintaining the boring speed without a reduction.

Anhydrous silica particles are produced by high temperature hydrolysis of silicon tetrachloride in an oxy-hydrogen flame at 1000° C. or greater, for example, by the following reaction:

$$2H_2 + O_2 + SiCl_4 \rightarrow SiO_2 + 4HCl$$

Moreover, the particles of anhydrous silica are non-toxic, and because they are inert, there is not danger that they will become inflamed and explode even if they were to fill the air at high concentration, and thus the boring operation can be carried out safely.

An abrasive according to the second aspect of the present invention comprises abrasive grains and a hydrous resin which discharges water when the hydrous resin is pressed by the diamond segments or the temperature of the hydrous resin rises.

According to the second aspect, because the hydrous resin discharges water when the hydrous resin is pressed by the diamond segments or the temperature of the hydrous resin rises, the water can be reliably supplied to the diamond segments, and the diamond segments can be cooled efficiently by the heat being absorbed when the water evaporates.

Furthermore, even if the hydrous resin is conveyed to the downstream side of the boring member without being pressed by the diamond segments, it does not discharge the water even when it impacts with the inside of the dust collecting apparatus or the working material. Therefore, the abrasive does not wet the inside of the dust collecting apparatus, the working material, or to the proximity thereof.

In addition, unlike the wet method, because water can be supplied intensively only to the diamond segments, the diamond segments can be efficiently cooled, and even in the case that the amount of hydrous resin supplied is increased in order to decrease the rise in the frictional heat, it only leaks out to the area in proximity to the diamond segments. Thereby, even in the case that the hole is cut by the dry method, the heat generation by the core bits can be reduced, the boring speed can be maintained without a reduction, and thus the boring of a deep hole can be carried out by the dry method.

The hydrous resin may be a styrene resin in which a sulfonic acid group ($-SO_3^-$) serves as exchange groups. The hydrous resin may be easily permeated by water and have a high fluidity, and may contain water of 40 to 60 wt % when the hydrous resin is swelled by water.

The abrasive according to the second aspect may further include particles of anhydrous silica having a particle diameter from 5 nm to 50 nm and silanol groups in the surface thereof.

In this case, due to the anhydrous silica particles, the fluidity of the abrasive becomes high, and sufficient abrasive can be supplied to the diamond segments at the distal end of the core bit. Therefore, the diamond segments can further be cooled by efficiently supplying the hydrous resin in the abrasive to the diamond segments. Thereby, the heat generation by the boring of the core bit is further decreased, and while maintaining the boring speed without a reduction, the boring of a deep hole can be carried out using a dry method.

An abrasive according to the third aspect of the present invention comprises abrasive grains and a sublimate.

According to the third aspect, because the sublimate can be reliably supplied to the diamond segments. The diamond segments can be cooled efficiently by the heat being absorbed when the sublimate sublimates. Furthermore, unlike cooling using water, the sublimate does not wet the inside of the dust collecting apparatus, the abrasive, or the proximity thereof.

In addition, unlike the wet method, because only the diamond segments are cooled intensively, the diamond segments can be efficiently cooled, and it does not wet the outside and inside of the apparatus at all. Thereby, even in the case that a deep hole is bored by the dry method, the heat generation by the boring of the core bit is decreased, and while maintaining the boring speed without a reduction, the boring of a deep hole can be carried out using a dry method.

The sublimate may be at least one of para-dichlorobenzene (sublimation temperature: 174° C.) and ammonium chloride (sublimation temperature: 338° C.). In consideration of operability, the sublimation temperature of the sublimate is preferably room temperature (20° C.) or greater, and preferably equal to or less than the degradation temperature of the diamond abrasive grains and the binding temperature at which the diamond segments adhere, which is 700° C. In addition, generally based on the heat generation temperature during boring, sublimation temperature is preferably 400° C. or less.

The abrasive may further include a hydrous resin which discharges water when the hydrous resin is pressed by the diamond segments or the temperature of the hydrous resin rises.

In this case, the boring of a deep hole can be carried out by a dry method in which the diamond segments can be cooled efficiently by the hydrous resin and the sublimate in the abrasive without leaking from the dust collecting apparatus or in the proximity thereof, the heat generation by the boring of the core bit is decreased, and the boring speed can be maintained without a reduction.

The abrasive may further include particles of anhydrous silica having a particle diameter from 5 nm to 50 nm and silanol groups in the surface thereof.

In this case, due to the particles of anhydrous silica, the fluidity of the abrasive becomes high, and the abrasive can be sufficiently supplied to the diamond segments at the distal end of the core bit. In addition, the diamond segments can further be cooled by efficiently supplying a hydrous resin and a sublimate in the abrasive to the diamond segments. Thereby, the boring of a deep hole can be carried out by the dry method in which the heat generation by the boring of the core bit is decreased, and while maintaining the boring speed without a reduction, the boring of a deep hole can be carried out using a dry method.

The boring method according to the present invention comprises: rotating a core bit which has a cylindrical shank and diamond segments provided on an end of the shank, the diamond segments having diamond grains supported by a binder; pressing the diamond segments against a working material in order to bore the working material; and supplying abrasive according to any one of the above aspects between the core bit and the working material to thereby dress the diamond segments.

In this method, the boring of a deep hole can be carried out by the dry method in which the heat generation by the boring of the core bit is decreased, and while maintaining the boring speed without a reduction, the boring of a deep hole can be carried out using a dry method.

DETAILED DESCRIPTION OF THE INVENTION

Below, the abrasive and the boring method using the same will be explained with reference to the figures.

Figure 1:
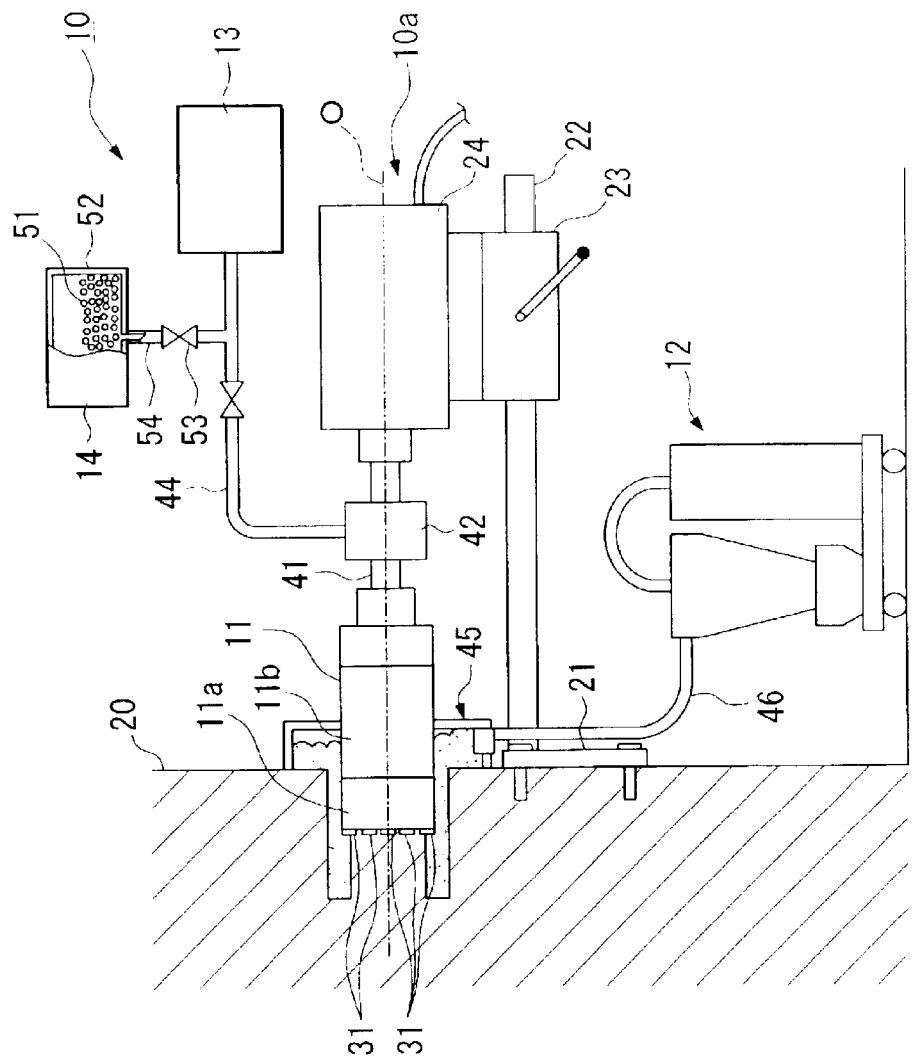
FIG. 1 is a structural drawing showing an example of a boring apparatus that uses the abrasive of the present invention.

FIG. 1 is a structural drawing showing an example of a boring apparatus that uses the abrasive of the present invention.

Figure 2:
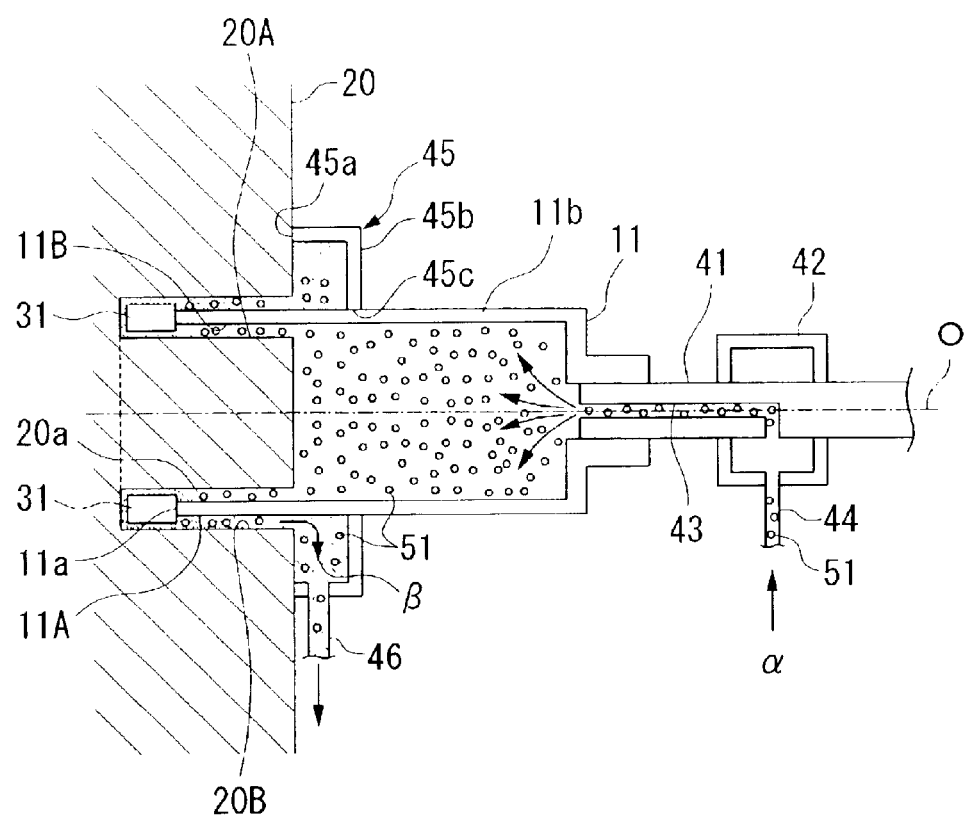
FIG. 2 is a cross-sectional drawing showing the vicinity of the cylindrical core bit of the boring apparatus shown in FIG. 1.

FIG. 2 is a cross-sectional drawing of the essential components showing the vicinity of the cylindrical core bit the boring apparatus 10 shown in FIG. 1.

In the figures, the boring apparatus 10 comprises an apparatus body 10a having a core bit 11, a dust collecting apparatus 12, for example, a cyclone-type dust collecting apparatus, that collects the chips, an air supplying apparatus 13 such as air compressor that supplies air to the boring member, and an abrasive supplying apparatus 14 that supplies the abrasive 51 that cools the boring member.

Figure 3:
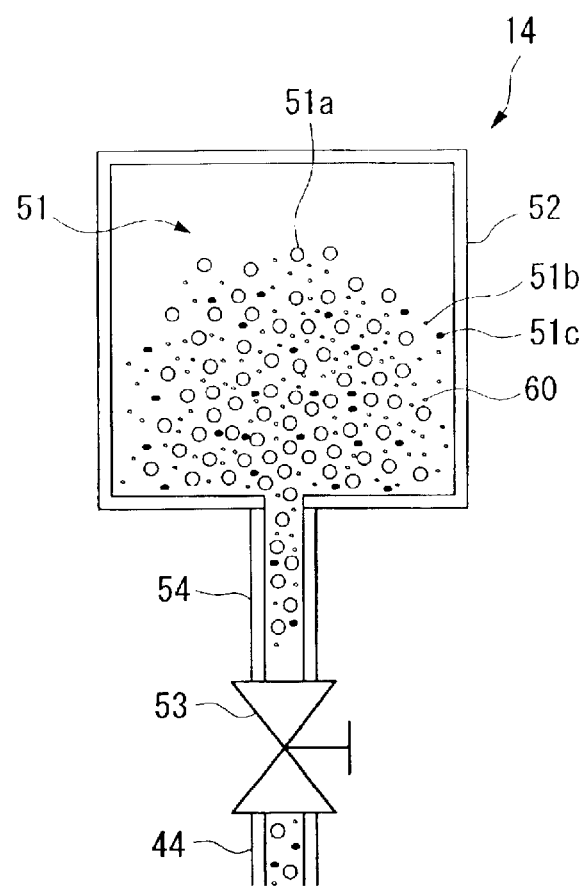
FIG. 3 is a cross-sectional drawing of the abrasion supplying apparatus shown in FIG. 1.
Figure 4:
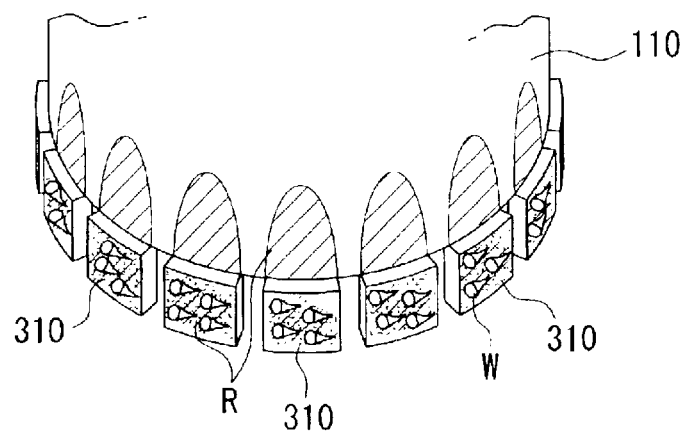
FIG. 4 is a perspective drawing of the distal end part of the core bit, and shows the bonded state of the chips by conventional dry boring.

The abrasive supplying apparatus 14 comprises an abrasive tank 52 that accommodates the abrasive 51 and an abrasive supplying pipe 54 that communicates with the supply pipe 44 via a valve 53. As shown in FIG. 3, the abrasive 51 is a mixture of particles of anhydrous silica 51b, a hydrous resin 51c, and abrasive grains 51a. However, one of anhydrous silica 51b and the hydrous resin 51c may be excluded from the abrasive 51. The abrasive 51 may also contain other compositions. The abrasive grains 51a may be at least one of alumina, silicon carbide, molding sand, and grinder powder.

The particles of anhydrous silica have a particle diameter of 5 nm to 50 nm and a silanol group (Si—OH) on the surface.

The hydrous resin is preferable a styrene resin in which sulfonic acid groups ($-SO_3^-$) serves as the exchange groups. Water can permeate the hydrous resin easily, and the hydrous resin has a high fluidity. Preferably, an ion exchange resin which can contain 40 to 60 wt % of water in the state in which water is incorporated and swelling has occurred.

As shown in FIG. 1, the apparatus body 10a comprises a base 21 that is fixed by an anchor to the surface of the working material 20, which comprises, for example, concrete or asphalt, an axle 22 that is fixed to the base 21 and extends in the vertical direction, a supporting part 23 that is installed on the axle 22 so as to freely reciprocate back and forth by the rotation of a handle, and a rotating drive apparatus 24 that is supported by the supporting part 23 and can rotate the core bit 11.

As shown in FIG. 2, to the distal end 11a, which is the open end of the cylindrical core bit 11 that is rotated around the axis O by the rotation drive apparatus 24, diamond segments 31 are attached, for example, by soldering at predetermined intervals in the circumferential direction so as to project from the distal end of the cylindrical shank 11b. Furthermore, in the axial direction of the core bit 11, the width of a diamond segment 31 is formed so as to be wider than the width of the core bit 11, that is, the distance between the inner circumferential surface 11B and the outer circumferential surface 11A of the core bit 11.

The diamond segments 31 are formed by dispersing diamond abrasive grains or the like in a binder phase made by sintering a binder material such as a metal bond. Preferably, the metal bond has mixed therein Ag, which increases the thermal conductivity, and is mixed in at 5 to 15% in consideration of the conditions such as the deformation during boring due to the decrease in the hardness of the bond and the cost of the raw materials.

At the proximal end of the core bit 11, a drive axle 41 that transmits a rotational drive force from the rotational drive apparatus 24 to the core bit 11 is connected coaxially to the axis O.

In this drive axle 41, a supply path 43, which supplies the air from the air supply apparatus 13 comprising, for example, an air compressor, and the abrasive 51 from the abrasive supply apparatus 14 through a hollow part in the core bit 11, and passes through coaxially to the axis O to communicate with the hollow part of the core bit 11. In addition, a supply pipe 44 connected to the air supply apparatus 13 and the abrasive supply apparatus 14 via an oil seal 42 is connected to this supply path 43.

A cylindrical pat 45 having an internal diameter that is larger than the external diameter of the core bit 11 is disposed on the external circumference of the core bit 11. The distal end 45a, which is the open end of the distal end side of the pat 45, abuts the surface of the working material 20, and the proximal end 45b of the pat 45 closes off the open end of the proximal end side of the pat 45, and at the same time forms a substantially circular plate having a core bit through hole 45c into which the core bit 11 is inserted. In addition, the outer circumferential surface 11A of the core bit 11 and the circular groove 20a formed by the working material 20 are covered by the pat 45. This pat 45 prevents the scattering of the dust and chips produced during boring, and at the same time, decreases the leakage of noise during boring.

In addition, a discharge pipe 46 discharges the air that contains chips, dust, and the like discharged from the groove 20a of the working material 20 and the abrasive 51 to the dust collecting apparatus 12 from the hollow part of the core bit 11 via the boring member in proximity to the diamond segments 31. This discharge pipe 46 is connected to the external circumferential surface of the pat 45.

The following boring operations are carried out in the boring method in which boring is carried out using an abrasive 51 in the boring apparatus 10 structured in this manner.

First, the core bit 11 is rotated around the axis O by the rotation drive apparatus 24. In this state, when the supporting part 23 is moved forward with respect to the axle 22, the diamond segments 31 attached to the distal end 11a of the core bit 11 are pressed into the working material 20, and cutting of a circular groove 20a is carried out.

At this time, the compressed air, for example, is supplied from the air supply apparatus 13 through a supply pipe 44, and at the same time, an appropriate amount of abrasive 51 is supplied from the abrasive supply apparatus 14 to the supply pipe 44 via a valve 53. When the air stream a that includes the abrasive 51 flows into the hollow part of the core bit 11 via the supply path 43 of the drive axle 41 from the supply pipe 44, the air stream α blows so as to apply pressure to the surface of the working material 20.

Subsequently, the air stream α is fed to the distal end of the core bit 11, that is, to the diamond segments 31, by passing through the gap between the inner circumferential surface 11B of the core bit 11 and the inner circumferential wall 20A of the groove 20a. Even when a deep hole is being cut, the fluidity of the abrasive 51 becomes high due to the particles of anhydrous silica 51b mixed into the abrasive 51, and along with the air stream α, the abrasive 51 is fed to the diamond segments 31 without being blocked within the narrow gap between the inner circumferential surface 11B of the core bit 11 and the inner circumferential wall 20A of the groove 20a.

The abrasive grains 51a, which are included in the abrasive 51, are conveyed by the air stream a and enter between the diamond segments 31 and the working material 20, carry out the dressing of the diamond segments 31, and along with preventing the loading of the diamond segments, also grind the working material 20, and thereby during the boring operation, a favorable boring condition is maintained. In addition, the anhydrous silica 51b increases the fluidity of the chips, promotes the discharge of the chips from the boring member, and prevents the chips from loading. The hydrous resin 51c included in the abrasive 51 exudes the water due to pressing against the diamond segments 31. When the water evaporates, the heat from the boring member in the vicinity of the diamond segments 31 is absorbed and the boring member is efficiently cooled.

Thereby, even when a deep hole is cut, the heat generation of the core bit 11 is decreased due to the reduction in friction heat originating in the loading and the like and the cooling of the boring member, and thereby the boring speed can be maintained.

The abrasive 51 that provides for the dressing and cooling of the diamond segments 31 and the grinding of the working material 20 is sent to the external circumferential wall 20B side of the grove 20, and fed to the proximal end side of the core bit 11, that is, to the open part of the groove 20a, through the gap between the external circumference wall 20B of the groove 20a and the external circumferential surface 11A of the core bit 11. In addition, the air stream β that includes the dust, chips, and the like produced by the boring member where the abrasive 51, the diamond segments 31, and the working material 20 abut is discharged from the opening of the groove 20a into the space enclosed by the external circumferential surface 11A of the core bit 11 and the pat 45, and conveyed by the dust collecting apparatus 12 via the discharge pipe 46.

In the boring apparatus 10 according to the dry method providing the structure described above, in the case that abrasion grains 51a having mixed therewith particles of anhydrous silica 51b and hydrous resin 51c serves as an abrasive 51, the decrease in the heat generation by the core bit 11 and the possibility of boring a deep hole while maintaining the boring speed is described in detail based on the following test experimental data.

In order to measure the boring speed with respect to the working material, a 120 V×20A motor was used as a rotation drive apparatus, and the boring of the working material was carried out while rotating the core bit at 400 rotations per second. Here, a core bit was used that had the following characteristics: a cylindrical shank thickness of 3 mm; an inner diameter of 102 mm; an outer diameter of 108 mm; an inner diameter of 100 mm, and an outer diameter of 110 mm, at the position of the diamond segments.

The length of each diamond segment in the circumferential direction was 20 mm, the width of the diamond segment in the radial direction was 5 mm; the thickness of the diamond segment in the axial direction was 7 mm; the number of diamond segments attached in the circumferential direction was 10; and the total length of the effective boring length of the core bit was 600 mm.

The diamond segments used are formed by dispersing into a binder material (Fe binder containing Ag of 5 to 15 wt %) high-grade diamond grains having a mesh size of #30/40 at a density of 1.32 ct/cc. The amount of Ag in the bond is sufficient to increase the thermal conductivity but not lower the hardness of the binder. When boring, air is supplied at a rate of 90 liters/minute, and furthermore, silicon carbide (SiC) having a mesh size #40 to 60 is supplied from the air supply apparatus at a rate of 6 to 10 g/minute as abrasive grains in the abrasive.

Two types of working material were used: reinforced concrete into which metal rods having a diameter of 32 mm are embedded at equal intervals in a light concrete having an aggregate with a fine particle diameter (below, referred to as light reinforced concrete); and a reinforced concrete into which metal rods having a diameter of approximately 25 mm are embedded at equal intervals in a hard concrete that includes a heat-instable quartz crushed stone as an aggregate (below, referred to as hard reinforced concrete). The reinforcement ratios expressed by the volume ratio of the concrete core of the light reinforced concrete is about 1.2% and the hard reinforced concrete is 0.8%.

In the experiments, in a state in which the number of rotations of the core bit is maintained at 400 rpm, the time required to cut the working material described above 30 cm is measured, the boring depth per minute is found from this measured required time, and comparison was carried out using this as the boring speed.

In Table 1, with respect to the two types of working material described above, the value of the boring speed (unit: cm/min) was recorded for the cases of boring by the wet method (abbreviated in the Table as wet boring), boring using the conventional dry method that includes abrasive grains in the abrasive (abbreviated in the Table as dry boring), and boring using the dry method that includes particles of anhydrous silica in the abrasive at various concentrations (unit: wt %). Hydrophilic anhydrous silica particles having a particle diameter of 12 nm were used.

TABLE 1

| | Light reinforced concrete | Hard reinforced concrete |
|---|---|---|
| Wet boring | 3.43 | 0.66 |
| Conventional dry boring | 2.44 | 0.28 |
| Abrasive grains + 0.5% anhydrous silica | 3.75 | 0.69 |
| Abrasive grains + 1.0% anhydrous silica | 3.72 | 0.72 |
| Abrasive grains + | 3.64 | 0.65 |

TABLE 1-continued

|  | Light reinforced concrete | Hard reinforced concrete |
|---|---|---|
| 1.5% anhydrous silica | | |
| Abrasive grains + 2.0% anhydrous silica | 3.28 | 0.53 |
| Abrasive grains + 2.5% anhydrous silica | 2.91 | 0.49 |

In the case that the abrasive includes anhydrous silica particles, clearly, the boring speed has increased in comparison to boring using the conventional dry method, and furthermore, in the case that the anhydrous silica particles are incorporated in the abrasive at between 0.5 to 1.5 wt %, the boring speed is actually greater than that of the wet method. In addition, in the case of using an abrasive that incorporates anhydrous silica particles, it has been confirmed that the adhesion of the chips to the core bit decreases, and clearly the discharged chips increased. Thereby, the heat generation due to the friction heat caused by the loading of the chips is suppressed, and the temperature of the core bit measured after boring at the distal end of the core bit at a location just in back of a diamond segment in the axial direction was decreased to about 50° C. in the case that anhydrous silica was mixed into the abrasive at 1.0 wt % in comparison to the 80° C. when boring with a conventional dry method. In addition, adhesion of the abrasive grains to the core bit was not found, and thereby, it was judged that the abrasive grains were supplied to the diamond segments without being blocked.

As is indicated by the experimental results, due to incorporating particles of anhydrous silica in the abrasive, the fluidity of the abrasive become high, and even when boring a deep hole, sufficient abrasive grains can be supplied to the diamond segments at the distal end of the core bit. In addition, the dressing of the diamond segments could be carried out efficiently, and the heat generated by the boring of the core bit can be reduced by preventing loading of the diamond segments due to chips. In addition, because the fluidity of the chips similarly increases due to the particles of anhydrous silica, the chips could be efficiently discharged without loading at the distal end of the core bit, and heat generation by the core bit was decreased by decreasing the frictional heat between the chips and the working material.

Thus, boring of a deep hole can be carried out by the dry method by decreasing the heat generation of the core bit and maintaining the boring speed without a reduction.

Moreover, the amount of anhydrous silica in the abrasive is preferably 0.5 to 1.5 wt %. As can be understood from Table 1, when the amount of the anhydrous silica exceeds 2.0 wt %, the boring speed actually decreases because only the anhydrous silica is supplied to the diamond segments, while the supply of abrasive grains thereto becomes insufficient.

Next, the values of the boring speed (unit: cm/min) are recorded in Table 2 for the following cases for two types of abrasive on light reinforced concrete and hard reinforced concrete, which differ in rigidity as described above: boring by the wet method (abbreviated wet boring in the Table); boring by the conventional dry method that includes only abrasive grains in the abrasive (abbreviated dry boring in the Table); boring by the dry method in the case that hydrous resin is incorporated into the abrasive at various concentrations (unit: wt %); and boring by a dry method in the case that in addition to the hydrous resins, particles of anhydrous silica are incorporated into the abrasive at various concentrations (unit: wt %). A styrene resin having sulfonic acid groups ($-SO_3^-$), a gel cross-linked ration of 4%, and a water content of 57 to 67%, was used as the anhydrous resin. In addition, the anhydrous silica particles are hydrophilic and have a particle diameter of 12 nm.

TABLE 2

|  | Light reinforced concrete | Hard reinforced concrete | Tool temperature (° C.) |
|---|---|---|---|
| Wet boring | 3.43 | 0.66 | — |
| Conventional dry boring | 2.44 | 0.28 | 80 |
| Abrasive grains + 10% Hydrous resin | 3.13 | 0.56 | — |
| Abrasive grains + 20% Hydrous resin | 3.55 | 0.67 | 40 |
| Abrasive grains + 30% Hydrous resin | 3.21; Abrasive grain loading | Loading | — |
| Abrasive grains + 20% Hydrous resin + 0.5% Anhydrous silica | 3.91 | 0.77 | 40 |
| Abrasive grains + 20% Hydrous resin + 2.0% Anhydrous silica | 3.87 | 0.79 | — |

In the case that a hydrous resin was incorporated into the abrasive, clearly the boring speed increased in comparison to the conventional dry method, and furthermore, in the case that the hydrous resin is incorporated into the abrasive at 20 wt %, the boring speed was actually greater than that of the wet method. This is because the diamond segments are cooled by the water that exudes from the hydrous resin. The temperature of the core bit measured after boring at the distal end of the core bit at a location just in back of a diamond segment in the axial direction was decreased to about 40° C. in the case that hydrous resin was incorporated into the abrasive at 20 wt %, in comparison to approximately 80° C. when boring by the conventional dry method. However, as can be understood from Table 2, when the amount of the hydrous resin becomes too large, the fluidity of the abrasive deteriorates and the abrasive cannot be supplied sufficiently to the diamond segments, and thus the diamond segments become heated, friction occurs, which in turn causes loading. Therefore, the amount of hydrous resin in the preferably does not exceed 30 wt %, and most preferably is incorporated at about 20 wt %.

As shown by the results of the experiments, the water that is exuded by the hydrous resin being pressed against the diamond segments, and thus the water is supplied reliably to the diamond segments. The diamond segments can be cooled efficiently by the heat being absorbed when this water evaporates. In addition, unlike the dry method, the water is supplied intensively only to the diamond segments, and thereby they can be efficiently cooled, and even when the amount of supplied hydrous resin is increased because of an increase in the frictional heat, it does not leak to locations outside the proximity of the diamond segments.

Thus, even when a deep hole is cut by the dry method, the heat generated by the boring of the core bit can be suppressed by cooling and the boring speed can be maintained without a reduction.

However, because the fluidity of the abrasive deteriorates in the case that a hydrous resin is included in the abrasive, there is practical a limit to the amount of the hydrous resin. Thus, even if a constant effect is obtained in which increasing the boring speed by cooling the diamond segments, further increases do not lead to any improvement. In consideration of this, Table 2 shows that the boring speed in the case in which, in addition to hydrous resin, particles of anhydrous silica are incorporated in order to increase the fluidity of the abrasive. That is, the values of the boring speed are shown for the case in which a hydrous resin is incorporated at 20 wt % and then anhydrous silica particles are added at 0.5 wt % to the abrasive and the case in which anhydrous silica particles are added at 2.0 wt % to the abrasive in order to obtain a high boring speed.

In either of the cases, in comparison to incorporating only the hydrous resin in the abrasive, the boring speed increases, and high values are obtained even in comparison to the case of boring by the wet method. This is because the fluidity of the abrasive increases due to the particles of anhydrous silica, and sufficient abrasive can be supplied to the diamond segments at the distal end of the core bit. In particular, the diamond segments can be cooled by efficiently supplying the hydrous resin in the abrasive to the diamond segments.

Thus, the heat generation by the boring of the core bit can be reduced, and the boring of a deep hole can be carried out by the dry method while maintaining the boring speed without a reduction.

Moreover, in the case of hard reinforced concrete, when carrying out the boring by the conventional dry method, only about 20 cm could be continuously cut, but in the case of using an abrasive incorporating anhydrous silica and hydrous resin, it is confirmed that continuous boring could be carried out up to 70 cm.

Next, the case in which a sublimate is mixed into the abrasive grains 51a is used as an abrasive 51 will be described below based on the test experimental data.

In order to measure the boring speed with respect to the working material, a 120 V-340 W alternating current motor was used as a rotation drive apparatus, and the boring of the working material was carried out while rotating the core bit at 300 rotations per second. A core bit was used that had the following characteristics: a cylindrical shank thickness of 3 mm; an inner diameter of 102 mm; an outer diameter of 108 mm; an inner diameter at the position of the diamond segments of 100 mm; an outer diameter of 110 mm. The length of each diamond segment in the circumferential direction was 20 mm; the width of the diamond segments in the radial direction was 5 mm; the thickness of the diamond segments in the axial direction was 7 mm; the number of diamond segments attached in the circumferential direction was 10; the total effective boring length of the core bit was 600 mm. The diamond segments used are formed by dispersing into a binder material (Fe binder containing Ag of 5 to 15%) at a density of 1.32 ct/cc high-grade diamond abrasive grains having a mesh size of #30/40. When boring, air is supplied at a rate of 90 liters/minute by an air supplying machine, and furthermore, the silicon carbide (SiC) having a mesh size #40 to 60 is supplied at a rate of 6 to 10 g/minute as abrasive grains in the abrasive. Unreinforced concrete having a compression strength of 50 N/mm$^2$ was used as a working material.

In the experiment, in a state in which the rotation of the core bit was maintained at 300 rpm, the time required to cut the above working material 300 mm in a horizontal direction was measured, the boring depth per minute was found from this measured required time, and this served as the boring speed when the comparison was carried out. Simultaneously, the tool temperature and the reaction received by the boring apparatus 10 were measured and compared.

In Table 3, for the working material described above, the values of the boring speed (unit: mm/min), heat temperature, and the reaction force (Kg/cm$^2$) for boring using the conventional dry method that includes only abrasive grains without mixing in the sublimate and boring by the dry method in the case that ammonium chloride (sublimation temperature: 338° C.) is incorporated into the abrasive at various amounts (unit: wt %) as a sublimate.

TABLE 3

|  | Boring speed (mm/min) | Tool temperature (° C.) | Reaction force (kg/cm$^2$) |
| --- | --- | --- | --- |
| Conventional dry boring | 14.6–17.9 | 100–200 | 31.4–40.0 |
| Abrasive grains + 1% Sublimate | 16.0–18.2 | 92–110 | 28.5–37.1 |
| Abrasive grains + 5% Sublimate | 16.5–19.4 | 85–90 | 34.2–40.0 |
| Abrasive grains + 10% Sublimate | 15.2–18.9 | 79–83 | 34.3–48.5 |

In the case that a sublimate is incorporated into the abrasive, clearly the boring speed has increased in comparison to the boring using the conventional dry method, and the heat generation is suppressed. The reaction force was confirmed to be less than boring using the conventional dry method if the sublimate is mixed at 5% or less.

As these experimental results show, by incorporating a sublimate into the abrasive, the heat generation of the core bit can be decreased.

Moreover, the amount of sublimated in the abrasive is preferably 3 to 7 wt %. As can be understood form Table 3, when the amount of sublimate exceeds 5.0 wt %, the decrease in the volume of the abrasive at the distal end of the core bit due to the sublimation of the sublimate becomes large, and because the abrasive is insufficient, the reaction force becomes large.

In addition, the sublimation temperature of the sublimate is preferably 20 to 700° C., and more preferably 20 to 400° C. When the sublimation temperature is too low, handling becomes difficult and its operability deteriorates. When the sublimation temperature is too high, the diamond grains deteriorate, and there is a concern that the binding of the diamond segments may be damaged.

According to the embodiment described above, in the case that a deep hole is cut by the dry method, the heat generation of the core bit by the boring can be decreased, and boring can be carried out maintaining the boring speed.

Moreover, in the present embodiment, as an abrasive, along with abrasive grains, particles of anhydrous silica and/or hydrous resin were incorporated in advance, but the particles of anhydrous silica and hydrous resin can be supplied separately to the abrasive grains and mixed during the supply process. In the present embodiment, in carrying out the boring operation, only one example of the most efficient case was given, but there is no particular limitation on the how the particles of anhydrous silica, hydrous resin, or sublimate are supplied.

What is claimed is:

1. An abrasive supplied between diamond segments of a core bit and a working material to be bored by the core bit in order to dress the diamond segments, the diamond segments having diamond grains supported by a binder, the abrasive comprising:

abrasive grains; and particles of anhydrous silica having a particle diameter from 5 nm to 50 nm and silanol groups in the surface thereof.

2. An abrasive supplied between diamond segments of a core bit and a working material to be bored by the core bit in order to dress the diamond segments, the diamond segments having diamond grains supported by a binder, the abrasive comprising:

abrasive grains; and a hydrous resin which discharges water when the hydrous resin is pressed by the diamond segments or the temperature of the hydrous resin rises.

3. An abrasive according to claim 2, further comprising particles of anhydrous silica having a particle diameter from 5 nm to 50 nm and silanol groups in the surface thereof.

4. An abrasive supplied between diamond segments of a core bit and a working material to be bored by the core bit in order to dress the diamond segments, the diamond segments having diamond grains supported by a binder, the abrasive comprising abrasive grains and a sublimate.

5. An abrasive according to claim 4, further comprising a hydrous resin which discharges water when the hydrous resin is pressed by the diamond segments or the temperature of the hydrous resin rises.

6. An abrasive according to claim 4 or 5, further comprising particles of anhydrous silica having a particle diameter from 5 nm to 50 nm and silanol groups in the surface thereof.

7. A boring method comprising:

rotating a core bit which has a cylindrical shank and diamond segments provided on an end of the shank, the diamond segments having diamond grains supported by a binder;

pressing the diamond segments against a working material in order to bore the working material; and supplying abrasive between the core bit and the working material to thereby dress the diamond segments, the abrasive including abrasive grains and at least one of:

particles of anhydrous silica having a particle diameter from 5 nm to 5 nm with particles of silanol groups in the surface thereof;

a hydrous resin which discharges water when the hydrous resin is pressed by the diamond segments or the temperature of the hydrous resin rises; and a sublimate.

\* \* \* \* \*